(12) United States Patent
Nielsen et al.

(10) Patent No.: US 12,219,326 B2
(45) Date of Patent: *Feb. 4, 2025

(54) HEARING INSTRUMENT CHARGER DEVICE AND SYSTEM, AND A METHOD OF MANUFACTURING A HOLDER THEREFOR

(71) Applicant: GN Hearing A/S, Ballerup (DK)

(72) Inventors: Henrik Nielsen, Roskilde (DK); Søren Davids, Jyllinge (DK); Thomas John Chappell, Evanston, IL (US)

(73) Assignee: GN HEARING A/S, Ballerup (DK)

( * ) Notice: Subject to any disclaimer, the term of this patent is extended or adjusted under 35 U.S.C. 154(b) by 11 days.

This patent is subject to a terminal disclaimer.

(21) Appl. No.: 18/106,446

(22) Filed: Feb. 6, 2023

(65) Prior Publication Data

US 2023/0188908 A1    Jun. 15, 2023

Related U.S. Application Data

(63) Continuation of application No. 16/700,690, filed on Dec. 2, 2019, now Pat. No. 11,582,566.

(51) Int. Cl.
*H04R 25/00* (2006.01)
*H02J 7/00* (2006.01)
(Continued)

(52) U.S. Cl.
CPC .......... *H04R 25/554* (2013.01); *H02J 7/0045* (2013.01); *H02J 50/005* (2020.01);
(Continued)

(58) Field of Classification Search
CPC .............................. B29C 64/10; H04R 25/658
See application file for complete search history.

(56) References Cited

U.S. PATENT DOCUMENTS

| 5,610,494 A | 3/1997 | Grosfilley |
| 8,137,607 B2 | 3/2012 | Kloeb et al. |

(Continued)

FOREIGN PATENT DOCUMENTS

| CN | 101529928 | 9/2009 |
| CN | 206790707 | 12/2017 |

(Continued)

OTHER PUBLICATIONS

Non-Final Office Action for U.S. Appl. No. 16/700,690 dated Jul. 7, 2022.

(Continued)

*Primary Examiner* — James Sanders
(74) *Attorney, Agent, or Firm* — Vista IP Law Group, LLP

(57) ABSTRACT

A hearing instrument charger device for charging an individually shaped hearing instrument, includes: a charger casing; a charger power supply within the charger casing; a first charger coil connected to the charger power supply; charger electronics for controlling charging of the hearing instrument; and a holder configured for receiving the hearing instrument, the holder located within the charger casing; wherein the holder for the hearing instrument has a shape that is specific for the individually shaped hearing instrument, such that when the individually shaped hearing instrument is received in the holder, a second charger coil of the individually shaped hearing instrument is in an operative position for receiving charging power from the first charger coil of the hearing instrument charger device.

17 Claims, 4 Drawing Sheets

(51) Int. Cl.
*H02J 50/00* (2016.01)
*H02J 50/10* (2016.01)

(52) U.S. Cl.
CPC .......... *H02J 50/10* (2016.02); *H04R 25/658* (2013.01); *H04R 2225/31* (2013.01)

(56) References Cited

U.S. PATENT DOCUMENTS

| | | | |
|---|---|---|---|
| 9,543,778 | B1 | 1/2017 | Corti |
| 2004/0107080 | A1 | 6/2004 | Deichmann et al. |
| 2008/0292123 | A1 | 11/2008 | Jensen |
| 2009/0010462 | A1 | 1/2009 | Ekchian et al. |
| 2016/0050503 | A1 | 2/2016 | Naether |
| 2017/0127199 | A1 | 5/2017 | Marxen et al. |
| 2019/0089187 | A1 | 3/2019 | Konomi |

FOREIGN PATENT DOCUMENTS

| | | |
|---|---|---|
| CN | 109848414 | 6/2019 |
| CN | 110112842 | 8/2019 |
| CN | 209234004 | 8/2019 |
| CN | 111131956 | 5/2020 |
| DE | 29718104 | 1/1998 |
| EP | 1246506 | 10/2002 |
| EP | 1921894 | 5/2008 |
| EP | 2 190 220 A2 | 5/2010 |
| EP | 3316444 A2 | 5/2018 |
| EP | 3518560 | 7/2019 |
| GB | 2569536 | 6/2019 |
| JP | H09103000 | 4/1997 |
| WO | WO 2018119176 | 6/2018 |
| WO | WO 2019/091571 | 5/2019 |
| WO | WO 2020264354 | 12/2020 |
| WO | WO 2021083931 | 5/2021 |

OTHER PUBLICATIONS

Notice of Allowance for U.S. Appl. No. 16/700,690 dated Oct. 26, 2022.
European Search Report dated Aug. 28, 2020 for EP Appln. No. 20165551.1.
European search report dated Sep. 2, 2021 for European patent application No. 21159877.6.
Technical examination report dated Aug. 31, 2021 for Danish patent application No. PA 2021 70091.
PCT International Search Report and Written Opinion for International Appln. No. PCT/EP2020/084088 dated Feb. 16, 2021.
Foreign OA for CN Patent Appln. No. 202080083189.9 dated Dec. 6, 2024.

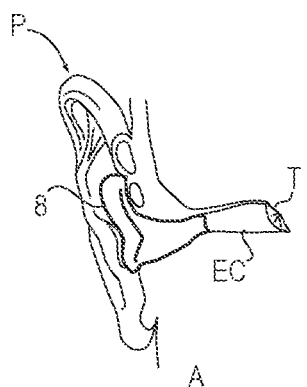 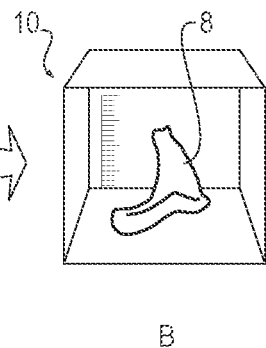 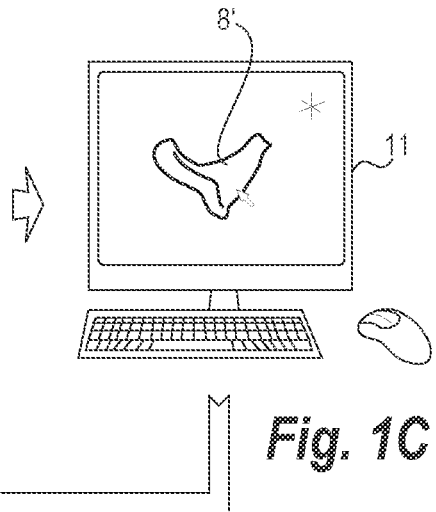
*Fig. 1A*     *Fig. 1B*     *Fig. 1C*
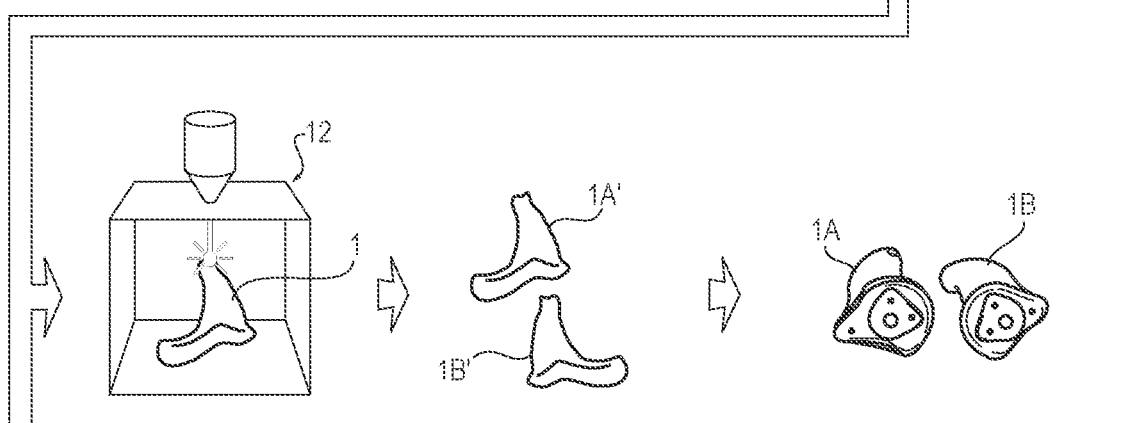
*Fig. 1D1*     *Fig. 1D2*     *Fig. 1D3*
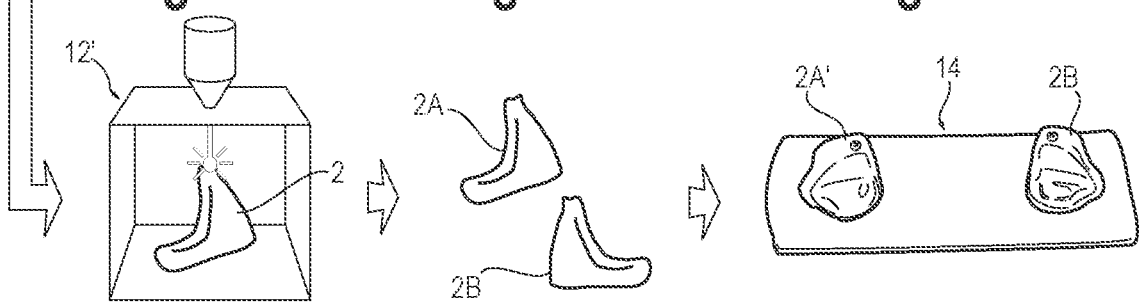
*Fig. 1E1*     *Fig. 1E2*     *Fig. 1E3*

HEARING INSTRUMENT CHARGER DEVICE AND SYSTEM, AND A METHOD OF MANUFACTURING A HOLDER THEREFOR

RELATED APPLICATION DATA

This application is a continuation of U.S. patent application Ser. No. 16/700,690 filed on Dec. 2, 2019, pending. The entire disclosure of the above application is expressly incorporated by reference herein.

FIELD

The present disclosure relates to a method of manufacturing a holder for holding an individually shaped, chargeable hearing instrument in a hearing instrument charger device configured for charging the hearing instrument. The disclosure further relates to hearing instrument charger device and a hearing instrument charger system comprising a hearing instrument and a hearing instrument charger device.

BACKGROUND

Rechargeable in-the-ear hearing aids are known in the art. In order to recharge such hearing aids, a hearing aid user is equipped with a charging device. The charging device and the hearing aid may each comprise a charger coil, such that the hearing aid may be charged "wirelessly", thereby avoiding that the in-the-ear hearing aid needs to be equipped with a galvanic contact. Such charging devices may have a holder for inserting and holding the hearing aids in a fixed position in the charging device during charging.

It is a problem with these devices that the charger coils may not always be brought into alignment with each other, whereby the charging process may be interrupted or slowed down.

Therefore, it is an object to provide a more stable charging of a hearing instrument, such as hearing aid.

It is a further object to manufacture a custom hearing instrument holder for a generic hearing instrument charger device for a custom RHI (Rechargeable Hearing Instrument), which is low-cost, fast and simple to manufacture without post treatment and which fulfills biocompatibility and medical grade requirements.

U.S. Pat. No. 8,137,607 discloses a reusable tool for making parts by a process where a mixture of sand and an activator is applied as a layer onto which a printed resin is deposited to form a base and a pattern. A stamping die may be formed by drawing a vacuum through the sand layer as a resin coating is applied to permeate the stamping die. The use of sand is unsuitable for manufacturing parts the size of hearing instruments (a few centimeters) and with sufficient details (below 1/10 mm).

WO 2018/119176 discloses a system for applying topical agents to an isolated body part. The system includes an applicator mask having an applicator surface having a three-dimensional shape corresponding to the isolated body part, and at least one membrane releasably disposed on the applicator surface and having an outer surface in facing relation with the applicator surface and inner adhesive surface opposite thereof. 3D printing and thermo-vacuum forming methods may be used to form the applicator mask, but the methods are seen as mutually exclusive.

SUMMARY

In a first aspect, the objects are achieved by a method of manufacturing a holder for holding an individually shaped, chargeable hearing instrument in a hearing instrument charger device configured for charging the hearing instrument, and comprising a first charger coil, wherein the method comprising the steps of determining a shape of at least a portion of an ear canal of a user from an ear canal impression;

designing digitally on a computer, based on the determined shape of the portion of the ear canal, a virtual representation of a hearing instrument shell of the hearing instrument, and planning a position in the hearing instrument for a second charger coil;

shaping a holder, based on the virtual representation of the hearing instrument shell, such that the holder, when located in a hearing instrument charge device, supports the shape of the hearing instrument in a predetermined position, and such that the first charger coil is adjacent to the second charger coil.

Thereby, a perfect alignment of the charger coil of the hearing instrument (second charger coil) with the charger coil of the hearing instrument charger device (first charger coil is assured, whereby a stable charging process is assured. Since the charging/recharging is wireless, with a holder manufactured in this way, the distance between the charging coils in the hearing instrument charger device and the charger coil or coils in the RHIs is minimized to maintain efficiency.

A virtual representation in a computer may be provided as a vector or point cloud set or other type of 3D data file.

The shaping of a holder may be done automatically during a modeling stage or done by an operator on a computer screen, when the operator is modelling/designing the positions of the receiver, rechargeable battery, and electronics in the finished hearing instrument, in a 3D data file providing the design for the finished hearing device.

In an embodiment, the step of determining a shape of at least a portion of an ear canal also comprises determining the shape of the user's tragus. Thereby, a hearing instrument can be shaped to match also the tragus of the user, which aids in inserting the hearing instrument correctly in the ear canal with respect to its rotational orientation.

In an embodiment, the step of shaping the holder comprises the steps of shaping an inlay, with at least a subset of surfaces identical to corresponding surfaces of the virtual hearing instrument shell; and forming the holder around the inlay.

Thereby, an efficient and cost-efficient way of forming the holder is obtained, and which may be provided in readily available, biocompatible, medical grade materials.

In an embodiment, the step of shaping the inlay comprises rapid prototyping (RPT) the inlay, based on the virtual representation of the hearing instrument shell.

The rapid prototyping may comprise laser printing the inlay or milling the inlay.

In either of the above-mentioned cases, the step of shaping the holder may comprise thermoforming a sheet of plastic over a part of the inlay. In an embodiment, the step of thermoforming a sheet of plastic over a part of the inlay comprises vacuum forming the sheet of plastic over a part of the inlay.

The sheet of plastic may be formed in polyethylene (PE), polypropylene (PP), or polyethylene terephthalate glycol (PETG).

Preferably, the holder is formed in a biocompatible material.

In either of the above-mentioned embodiments, the step of determining a shape of at least a portion of an ear canal of a user comprises
inserting a portion of a pliable material into the ear canal and tragus of a user, thereby forming an ear canal impression, and
scanning the ear canal impression and entering the scanned shape into the computer.

In alternative embodiments, the shape could be determined by scanning the ear canal of the user, for example using MRI—or ultrasound scanning or other suitable 3D scanning technique.

The pliable material may be a silicone material, such as provided by the manufacturer Egger (Egger Otoplastik+Labortechnik GmbH) or the manufacturer Dreve Otoplastik GmbH. Such materials are often silicone based, liquid materials, typically comprising a filler and a hardener. An example of such a two-component impression material is the range of Otoform® materials from the manufacturer Dreve. The material will cure in a couple of minutes, thanks to the hardener, and the material is fully biocompatible. Also known in the art, are silicone based, liquid materials configured for light curing.

In an embodiment, the material used for the holder is the same as used for the ear canal impression.

In a second aspect, the objects are achieved by a hearing instrument charger device for charging an individually shaped hearing instrument comprising a second charger coil, the hearing instrument charger device comprising
a charger casing;
a charger power supply arranged within the charger casing;
a first charger coil connected to the charger power supply, charger electronics for controlling charging of the hearing instrument; and
a holder configured for receiving the hearing instrument arranged within the charger casing,
wherein the holder for the hearing instrument is shaped such that the holder supports the shape of the hearing instrument, and such that the first charger coil is adjacent to the second charger coil, when the hearing instrument is received in the holder.

The holder may be manufactured by the process in any of the embodiments of the first aspect described above.

In an embodiment, the holder comprises surfaces identical to corresponding surfaces of the virtual hearing instrument, or at least a subset thereof.

In an embodiment, the holder for the hearing instrument is provided in a charger insert part.

The charger insert part may thereby be modelled/planned/designed for the custom-made, rechargeable hearing instrument to be inserted into a generic/standard hearing instrument charger device.

In an embodiment, the charger insert part may be formed by a vacuum formable sheet.

In an embodiment, the charger insert part is as a flat structure having an upper surface, a lower surface, and a peripheral rim, where the holder extends away from the lower surface, and where the peripheral rim is configured for cooperating with a rim of the charger casing.

In an embodiment, the hearing instrument charger device comprises a charger lid arranged to cooperate with the charger casing, and the first charger coil is arranged in the charger lid in such a way that the first charger coil is in an operative position for providing charging power to the second charger coil, when the hearing instrument is placed in the holder and the charger lid is closed.

Thereby, it may be achieved that the charging can only occur when the lid is closed, whereby the risk that the hearing instrument accidentally falls out of the hearing instrument charger device is reduced.

In a third aspect, the objects are achieved by a hearing instrument system comprising
a chargeable hearing instrument; and
a hearing instrument charger device according to any one of the embodiments of the second aspect.

The holder for the hearing instrument charger device may be manufactured by the process in any of the embodiments of the first aspect described above.

In an embodiment, the hearing instrument charger device comprises a charger lid arranged to cooperate with the charger casing, wherein the first charger coil is arranged in the charger lid, and wherein the hearing instrument comprises a second charger coil formed in an externally facing faceplate of the hearing instrument and where the first charger coil and the second charger coil are arranged such that they face each other when the hearing instrument is received in the holder and the lid is closed.

It should be emphasized that the term "comprises/comprising/comprised of", when used in this specification, is taken to specify the presence of stated features, integers, steps or components, but does not preclude the presence or addition of one or more other features, integers, steps, components or groups thereof.

BRIEF DESCRIPTION OF THE DRAWINGS

In the following, the embodiments will be described in greater detail with reference to the enclosed figures. It should be emphasized that the embodiments shown are used for exemplary purposes only and should not be used to limit the scope of the claimed invention.

FIG. 1A shows a partial section through an ear and ear canal of a human being and an ear canal impression in a portion of the ear canal;

FIG. 1B shows an ear canal impression located in a 3D-scanner;

FIG. 1C shows a PC with a keyboard, mouse and suitable 3D modelling software;

FIGS. 1D1-1D3 illustrates three steps of a process of forming a hearing instrument;

FIGS. 1E1-1E3 illustrates three steps of a process of forming a charger insert part with two holders, each for receiving a hearing instrument;

FIG. 3 illustrates an inlay corresponding to the hearing instrument shown in FIG. 2;

DETAILED DESCRIPTION OF THE EMBODIMENTS

Figure 2:
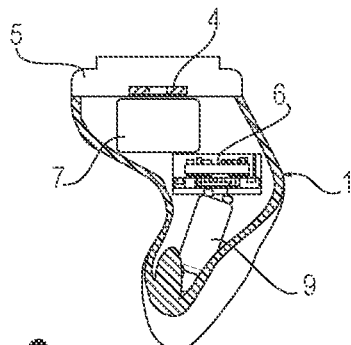
FIG. 2 shows a section through a hearing instrument.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1A, in a partially sectional view, shows an ear and ear canal EC of a (future) user of a hearing instrument, such as a hearing aid, and an ear canal impression 8 in a portion of the ear canal. In the figure, the reference P is the pinna of the user's ear. EC is the ear canal, which is shown in section, and T points to the tympanic membrane of the user's ear. The ear canal impression 8 is shown located inside the ear canal EC in a location like where a hearing device, such as hearing aid, would be located during use of such a device.

The ear canal impression 8 may be used in a known process to manufacture an individualized hearing instrument 1A, 1B, such as hearing aid.

Figure 7:
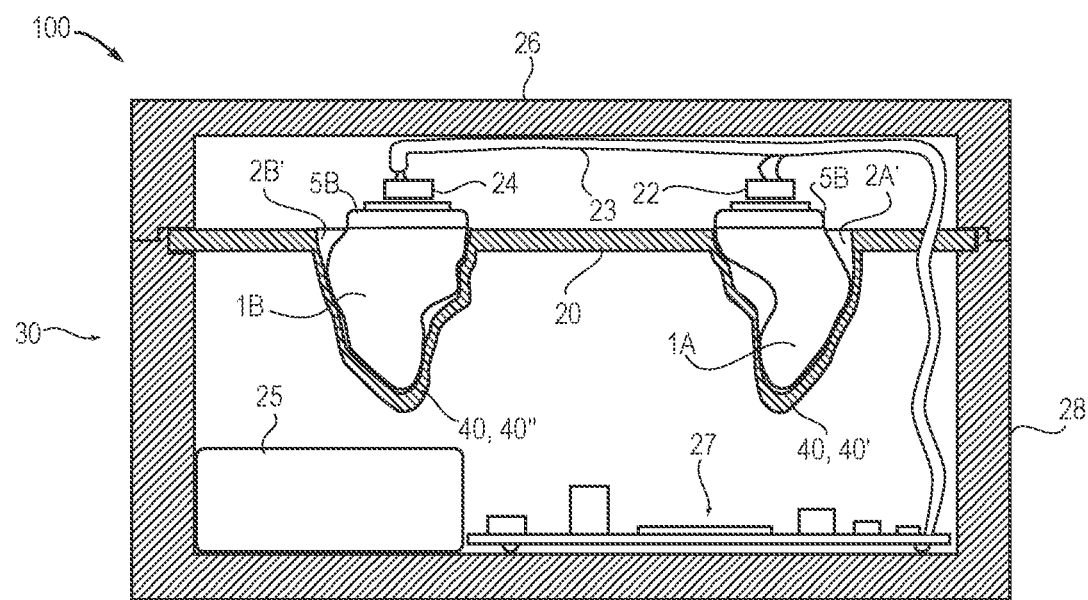
FIG. 7, in a cross-sectional side view, shows a hearing instrument charger device.

According to one aspect, ear canal impressions 8 may be used in a process to manufacture a holder for hearing instruments in a hearing instrument charging device 30, see FIG. 7, for charging the hearing instruments.

The hearing instrument 1A, 1B may for example be a prescription hearing aid for people with a diagnosed hearing loss, but the embodiments described herein may also be used in relation to the charging of other types of hearing instruments configured for being located in the ear canal of a user during use.

Today, hearing aid shells for customized hearing aids are made from digital 3D-scans of a cast of the ear canal, i.e. an ear canal impression 8 as shown in FIG. 1A.

FIG. 1A shows one ear and ear canal EC of a user, in this case the right ear and ear canal EC. It is clear that the user may also have a left ear and a left ear canal. In FIG. 1A, an ear canal impression 8 of the right ear canal EC is shown in position in the right ear canal EC. A person skilled in the art will realize that a similar impression may be made of the opposite ear canal of the user.

The ear canal impression 8 is made by pouring a casting material, typically a biocompatible, silicone-based material, into the ear canal of the user, who needs or wishes to purchase a customized/personalized/individualized hearing instrument. The casting material is a two-component liquid material comprising a filler and a curing agent. The casting material will cure within a few minutes after mixture of the two components.

Also, light curing of the casting material is known in the art, using silicone-based materials suitable for light curing.

Such silicone materials of both types are known in the art. Products typically used for this purpose are manufactured by the company Egger (egger Otoplastik+Labortechnik GmbH) or Dreve GmbH.

While the biocompatible, silicone-based material at least partially cures inside the ear canal of the user, the ear canal impression 8 will thereby be formed into a shape conforming to the shape of the ear canal EC. Typically, the biocompatible silicone-based material will also be made to cover the tragus of the user, such that the ear canal impression also reflects the shape of the user's tragus. Thereby, a hearing instrument 1A, 1B based on the ear canal impression 8 (see below), can be shaped to match also the tragus of the user, which aids in inserting the hearing instrument 1A, 1B correctly in the ear canal with respect to its rotational orientation.

When the material has cured, the ear canal impression 8 is removed from the ear canal EC of the user, and a digital 3D-scan is made of the ear canal impression 8, as illustrated in FIG. 1B, for use in a modeling stage performed by an operator by help of suitable 3D modelling software on a computer, illustrated in FIG. 1C.

FIG. 1B illustrates 3D scanning of the ear canal impression 8 of the ear canal EC of the ear shown in FIG. 1A. It is clear that instead of or in addition to the impression of the ear canal EC, shown in FIG. 1A, an impression of the opposite ear canal may be provided in the same manner.

In the modelling stage, the shape of the hearing instrument shell 1A', 1B' is determined based of the data from the scanning. Where the ear canal impression 8 is a solid model of the ear canal (or at least a suitable section thereof), the hearing instrument shell 1A', 1B' will be a hollow structure, having an outer surface with a shape conforming to the ear canal of the user, and an internal space for various components of the hearing instrument.

In the modelling stage, the positions of electronic components, for example a speaker (often referred to as a receiver), a rechargeable battery, microphones, etc., needed in the finished device (hearing instrument) are defined (planned) in a 3D data file providing the design/layout for the finished hearing instrument 1A, 1B. Thus, in the modelling stage, the shape of the electronic components and the locations/positions of the electronic components and other parts inside the hearing instrument shell is planned/designed.

The shape of the ear canals of one user may vary widely from those of other people's ear canals, and the two ear canals of one user may also differ in shape. Therefore, the space available for the internal components may vary from one hearing instrument to the next, and therefore the location/position of the internal components inside an individual hearing instrument may also vary.

When the layout of each of the future hearing instruments 1A, 1B has been planned, each hearing instrument shell 1A', 1B' is then manufactured, typically in a 3D-printer, as illustrated in FIG. 1D1. The hearing instrument shell 1A', 1B' may be manufactured directly from the design in a 3D data file created in the computer mentioned above, in the modelling stage, as described above.

Each of the hearing instrument shells 1A', 1B' may be manufactured in a biocompatible material, or be post-treated, such that it is suitable for inserting into the ear canal EC of a user under current biocompatibility and medical grade requirements and regulations. The material used may be pliant/resilient to ease the insertion of the finished hearing instrument 1A, 1B into the ear canal EC of the user, and such that the hearing instrument may adapt to e.g. jaw movements during use.

FIG. 1D1 illustrates a step of 3D printing a hearing instrument shell 1A', 1B'. It will be appreciated that other ways of forming the hearing instrument shells 1A', 1B' may be used.

FIG. 1D2 shows a set of finished hearing instrument shells 1A', 1B', a left hearing instrument shell 1A' shaped for the left ear canal, and a right hearing instrument shell 1B' shaped for the right ear canal of the user.

Figure 3:
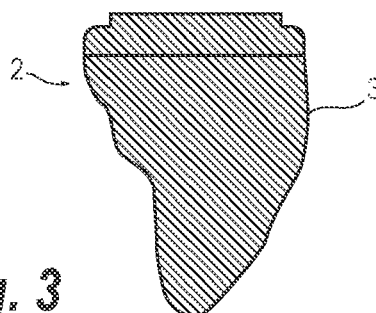

When the hearing instrument shell 1A', 1B' has been finished, internal components, e.g. as described above, are mounted in the hearing instrument shell 1A', 1B', e.g. manually at their planned/defined positions. FIG. 1D3 shows a set of finished hearing instruments 1A, 1B, one for the left ear and one for the right ear canal, i.e. hearing instrument shells 1A', 1B' with the internal components mounted within the internal space thereof.

Ear canal impressions 8 are often kept on record for later reproductions and documentation, etc.

Thus, FIGS. 1A-B illustrate one way of obtaining individualized information relating to the shape of the ear canal or ear canals of a user, by use of a cast (the ear canal impression) of the ear canal and 3D-scanning the cast. The data/information regarding the shape of the ear canal EC of the user (and in some cases also the shape of the tragus of the user) is transferred to a computer for further processing.

Thus, FIG. 1A illustrates a step A of obtaining an impression of an ear canal EC. FIG. 1B illustrates a step B of digitalizing the shape of the ear canal. FIGS. 1A-B thus also illustrate a combined step determining a shape of at least a portion of an ear canal of a user in a method of manufacturing a holder 40 for holding an individually shaped hearing instrument 1A, 1B in a hearing instrument charger device 30 configured for charging the hearing instrument 1A, 1B.

In principle this shape data/information may be obtained in other ways, e.g. by 3D-scanning the ear canal.

FIG. 1C illustrates how the obtained shape data in a step C is used to design/plan one or more hearing instrument 1A, 1B using a computer 11.

FIGS. 1D1-1D3 illustrates three steps of a known process of forming a hearing instrument 1A, 1B, using shape data 8' stored in the computer 11.

FIGS. 1E1-1E3 illustrates three steps of an embodiment of a process of forming at least one holder 40 for receiving a hearing instrument 1A, 1B in a hearing instrument charger device 30. More specifically, FIGS. 1E1-1E3 illustrates three steps of a process of forming a charger insert part 20 with two holders 40, each for receiving a hearing instrument 1A, 1B. The process relies on the process of obtaining individualized information/data relating to the shape of the ear canal EC or ear canals of a user for forming the hearing instruments 1A, 1B described above.

The data relating to the shape of the ear canal(s) EC of the user, entered into the computer may, in accordance some embodiments, be used to design a mould inlay or simply an inlay 2, 2A, 2B. The inlay 2, 2A, 2B, is shaped to complement the shape of the (finished) corresponding hearing instrument 1A, 1B. The design of the inlay 2, 2A, 2B is discussed in more detail in relation to FIGS. 3 and 4 below.

Now, with reference to FIG. 2, however, a hearing instrument 1A, 1B will first be described. FIG. 2 shows a section through a hearing instrument 1A, 1B. The hearing instrument 1A, 1B comprises a hearing instrument shell 1, made/formed as described above.

The hearing instrument 1A, 1B has a proximal end, which, when the hearing instrument 1A, 1B is inserted in the ear canal EC of the user, is closest to the eardrum, i.e. the tympanic membrane T, of the user, and an opposite distal end, which, when the hearing instrument 1A, 1B is inserted in the ear canal of the user, is located at the entrance to the ear canal EC of the user. The hearing instrument further comprises a set of internal components arranged inside the hearing instrument shell 1, 1A', 1B'.

These components comprise electrical components such as a speaker, which is commonly referred to as a receiver, hereinafter a hearing instrument receiver 9, a rechargeable battery (or hearing instrument rechargeable battery 7), a second charger coil 4, and control electronics; hearing aid electronics 6 for controlling at least the hearing instrument receiver 9 and the charging of the hearing instrument rechargeable battery 7 via the second charger coil 4. The second charger coil 4 is charged via first charger coil 22, 24 provided in a hearing instrument charger device 30 described in the following in connection with FIG. 7.

The hearing instrument receiver 9 is typically arranged in the proximal end of the hearing instrument 1A, 1B in order to be close to the eardrum of the user when inserted into the ear canal EC of the user. The other components may be arranged within the hearing instrument shell 1A', 1B' in positions that may vary dependent on the individual shape of the hearing instrument shell 1A', 1B'.

The hearing instrument 1A, 1B may further comprises a passage from the hearing instrument receiver 9 to the proximal end of the hearing instrument, a filter for preventing the earwax and other impurities from entering the hearing instrument 1A, 1B. Further, the internal surface of the internal space of the hearing instrument shell 1A', 1B' may be structured such that the internal components may be installed/mounted in the designed/planned positions.

The internal components may additionally comprise one or more microphones (not shown in FIG. 2). A microphone may for example be provided at the distal end of the hearing instrument.

The internal components may additionally comprise a device for wirelessly communicating with other equipment. For example, such a device may communicate with a behind-the-ear device, a mobile phone/cell phone, or other external electronic devices.

The electronic components located in the internal space of the hearing instrument 1A, 1B may be electronically connected to each other, e.g. by a suitable wiring, to transfer energy and/or data.

The hearing instrument 1A, 1B shown in FIG. 2, at the distal end, is provided with a faceplate 5, for closing the internal space of the hearing instrument 1A, 1B. The faceplate 5 is intended for sealing the internal space with the internal components from impurities from the external environment.

The faceplate 5, may be shaped to fit contours of the ear canal of the user. However, the distal end of the hearing instrument will typically not be in contact with any surfaces of the ear canal of the user but be located at the opening/entrance from the outer ear into the ear canal of the user when inserted in the ear canal.

Therefore, the faceplate 5 may be shaped with a regular planar surface, as shown in FIG. 2.

In the hearing instrument 1A, 1B shown in FIG. 2, the second charger coil 4 is shown adjacent to the faceplate 5. For example, the second charger coil 4 may be integrated in the faceplate 5. Alternatively, the charger coil 4 may be structurally connected to other components in the internal space or to internal walls of the hearing instrument 1A', 1B', and be located adjacent the internal surface of the faceplate 5. In some embodiments the second charger coil 4 may be located in a recess formed in the internal surface of the faceplate 5.

As it is also indicated above, the second charger 4 may, however,—in other embodiments—be located in other positions within the cavity/internal space of the hearing instrument 1A, 1B.

Referring now to FIGS. 1E1-1E3, a method of manufacturing a holder 40 for receiving a hearing instrument 1A, 1B in a hearing instrument charger device 30, is described.

FIG. 1E1 illustrates a step 1E of forming an inlay 2 for moulding a holder 40. The step forming of the inlay 40 may be done using 3D printing. The inlay 2 may be formed in the same material as the hearing instrument shells 1A', 1B'. However, other suitable materials may alternatively be used.

As mentioned, FIG. 1E1 illustrates 3D printing the inlay 2. However, other RPT (Rapid Proto-Typing) or milling technologies may be used for forming the inlay 2.

The inlay 2 is formed to generally correspond to the shape of the ear canal and to the shape of hearing instrument 1A, 1B to be charged when received in the holder 40. It will be appreciated that the shape of the inlay may not necessarily be 100% identical to the corresponding hearing instrument 1A, 1B. For example, some or all concave surfaces may not be reproduced in the inlay 2. This will be described in more detail below in connection with FIGS. 3 and 4.

Now, FIG. 1E2 shows a set of inlays 2A, 2B, each formed as described above. Inlay 2A corresponds in shape with the hearing instrument shell 1A' and the hearing instrument 1A shown in e.g. FIGS. 1D2 and 1D3, respectively. Similarly, the inlay 2B corresponds in shape with the hearing instrument shell 1B' and the hearing instrument 1B shown in e.g. FIGS. 1D2 and 1D3, respectively.

FIG. 1E3 shows, in a step E3, one way of forming holders 40 for the two hearing instruments 1A, 1B formed in steps E1, E2, by vacuum forming a vacuum formable sheet 14 over the two inlays 2A, 2B to obtain a charger insert part 20 with two holders 40 for a set of hearing instruments 1A, 1B.

Examples of suitable biocompatible, vacuum formable materials are polyethylene (PE), polypropylene (PP), and polyethylene terephthalate glycol (PETG).

Figure 5:
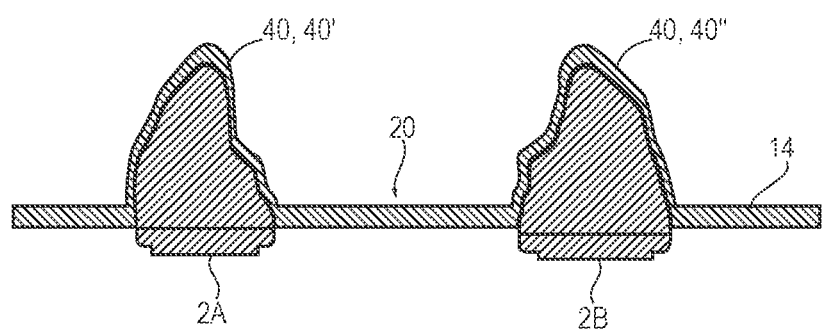
FIG. 5, in a cross-sectional side view, illustrates moulding of a charger insert part over a pair of inlays.

FIG. 5, in a sectional view, shows two inlays 2A, 2B over which a vacuum-formable sheet 14 has been laid and a vacuum has been applied to shape the vacuum formable sheet 14 into a charger insert part 20 with two holders 40, one 40' with a shape forming an impression 2A', i.e. a negative, of the left inlay 2A, and one 40" with a shape forming an impression 2B', i.e. negative, of the right inlay 2B. The material of vacuum-formable sheet 14 is preferably heated to a thermoplastic temperature prior to being formed over the inlays 2A, 2B. The vacuum-forming procedure may alternatively be carried out using an over-pressure higher than the current atmospheric pressure such that a pressure gradient forces the vacuum-formable sheet 14 into shape. Thereby the one holder 40' is configured for receiving a corresponding left hearing instrument 1A, and the other holder 40" is configured to receive a corresponding right hearing instrument 1B.

By thereby shaping the holders 40', 40" over the inlays 2A, 2B based on the custom data of the shape of the corresponding ear canals, it is achieved that the corresponding hearing instrument 1A, 1B can be inserted correctly only into one of the holders 40', 40", and held in only one position/orientation relative to the holder 40', 40". Thereby it is assured that the second charger coil 4 of the hearing instrument 1A, 1B is precisely aligned with a first charger coil 22, 24 arranged in a hearing instrument charger device 30, see FIG. 7 and the description thereof further below.

Figure 6:
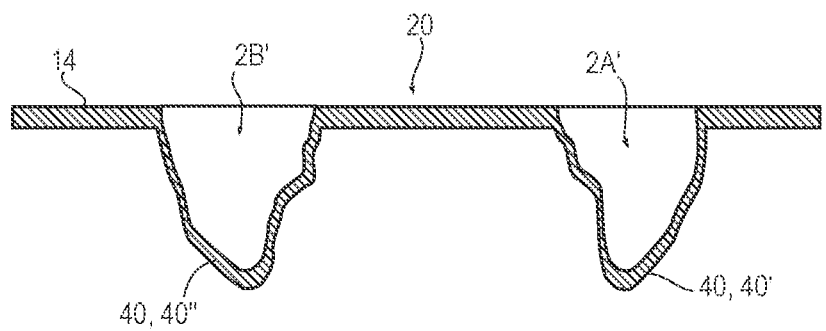
FIG. 6, in a cross-sectional side view, shows a finished charger insert part.

FIG. 6 shows a charger insert 20 shaped from a vacuum-formable sheet 14 as described above, and with two customized/individualized hearing instrument holders 40', 40" for holding respective customized/individualized hearing instruments 1A, 1B. It will be appreciated that the holders 40', 40" are formed as impressions 2A', 2B', thereby forming structures extending from a plane defined by the vacuum-formable sheet 14. FIG. 6 corresponds to FIG. 5, where the inlays 2A, 2B have been removed from the shaped holders 40', 40" and the charger insert 20 has been flipped around.

It will be appreciated that this way of forming holders 40 may also apply in forming just a single holder 40 for holding a single hearing instrument 1A, 1B, or for forming two individual holders for a set of hearing instruments 1A, 1B.

It will further be appreciated that one or more holders may be formed using other thermo-forming techniques in combination with the inlays 2, 2A, 2B.

In yet other embodiments one or more holders 40 may be formed by moulding using the inlays 2, 2A, 2B as inserts in a mould.

In yet other embodiments one or more holders 40 may be formed by 3D-printing, using data regarding the shape of the ear canals of the user as described above. In this case it will not be necessary to form any inlays. This method is, however, not considered cost-effective at present due to the necessary post-treatment of the holders manufactured using this method in order for the holders to comply with biocompatibility requirements.

FIG. 7 shows a hearing instrument charger device 30 wherein a charger insert part 20 as described above is inserted. The hearing instrument charger device 30 comprises charger casing 28 and a charger lid 26. The charger casing 28 forms an open box-shaped structure with an internal volume. The internal volume may host a charger power supply 25. In the embodiment shown, the charger power supply 25 is a battery. The battery may be a replaceable battery, either a singly non-chargeable battery or a chargeable battery. Alternatively, the battery could be a fixed chargeable battery. In embodiments, where the charger power supply 25 is a chargeable battery, the hearing instrument charger device 30 may provide a portable power bank for one or more hearing instruments 1A, 1B.

In other embodiments, the charger power supply 25 of the hearing instrument charger device 30 may be a transformer for converting mains power into power for the one or more hearing instruments 1A, 1B. In yet other embodiments, the charger power supply 25 of the hearing instrument charger device 30 may be a transformer connected to a rechargeable battery, such that the hearing instrument charger device 30 may charge one or more hearing instruments both when connected to the mains (via a not shown cable) and when disconnected from the mains.

The internal volume of the charger casing 28 of the hearing instrument charger device 30 may further host charger electronics 27 for controlling charging of the charger power supply 25 (when it's a fixed rechargeable battery) and/or the one or more hearing instruments 1A, 1B.

The hearing instrument charger device 30 further comprises first charger coils 22, 24, one for each hearing instrument 1A, 1B to be charged.

The charger electronics 27 is connected to the charger power supply 25 via suitable wiring (not shown). Further, the charger electronics are is connected to the first charger coils 22, 24.

The charger electronics 27 preferably is configured such that it may detect the presence of a hearing instrument 1A, 1B in the vicinity thereof and start charging if a hearing aid is present. This may be accomplished if presence of a first charger coil 4 of a hearing instrument 1A, 1B is detected.

The charger insert part 20 may, as shown in FIG. 7, cover the internal volume of the charger casing 28 being arranged on a rim of the box shaped charger casing 28.

The impressions 2A', 2B' forming the holders 40', 40" extend into the internal volume.

The position of holders 40', 40" relative to the charger insert part 20 is configured—during the modelling face—such that—when the charger insert part 20 is inserted in the charger casing 28, and when hearing instruments 1A, 1B are inserted into the holders 40', 40"—the second charger coil 4

(in each hearing instrument 1A, 1B, not shown in FIG. 7) is aligned with the respective ones of the first charger coils 22, 24.

A precise alignment of the first charger coils 4 with the second charger coils 22, 24 is also assured by the shape of the holders 40', 40" only allowing the respective hearing instrument 1A, 1B to be inserted in one specific orientation.

The first charger coils 22, 24 may, in one embodiment, and as shown in FIG. 7, be provided connected to the charger lid 26. Such a configuration of the hearing instrument charger device 30 may ensure that the charging is only started when the lid is closed and the first charger coils 22, 24 thereby have been brought into alignment with the second charger coils 4 in the corresponding hearing instruments 1A, 1B.

In the embodiment shown in FIG. 7, the holders 40', 40" and the charger insert part 20 are configured such that the hearing instruments 1A, 1B (when inserted in the holders 40', 40") are positioned upright with the proximal ends/faceplates 5, 5A, 5B facing upward and a plane defined by the surfaces of the faceplates 5A, 5B being parallel with a plane defined by the upper surface of the charger insert part 20. In this case the first coils 4 in the hearing instruments 1A, 1B, are arranged in the faceplates 5A, 5B as shown in FIG. 2.

It will however be appreciated that in alternative embodiments, the holders 40', 40" and the charger insert part 20 may be configured such that the hearing instruments 1A, 1B are oriented differently relative to the plane defined by the upper surface of the charger insert part 20 than shown in FIG. 7, for example, the hearing instruments 1A, 1B could be "laying down" rather than the upright position shown in FIG. 7. In such cases the second charger coils 4 in the hearing instruments 1A, 1B could be arranged parallel to a sidewall portion of the hearing instrument shells 1A', 1B', rather than in the faceplates 5A, 5B as shown in FIGS. 2 and 7.

It will also be appreciated that in yet other embodiments, the first charger coils 22, 24 may be arranged inside the charger casing 28 rather than in the charger lid 26, in which case the holders 40' 40", the charger insert part 20 and/or the hearing instruments 1A, 1B (the positioning or the first charger coils 4 in the hearing instruments 1A, 1B) is modelled and formed such that when the hearing instruments 1A, 1B are placed in the holders the first and second charger coils are aligned.

Markings may be formed on the charger insert part 20 next to the respective holder, the markings indicating which hearing instrument to insert in which holder 40', 40". The markings may e.g. be an "L" for "left" and "R" for "right" to indicate the place to insert and recharge the left and right hearing instruments 1A, 1B respectively. Other symbols or text may be considered alternatively. The markings may be formed as impressions in the charger insert part 20, e.g. by negatives formed on the inlays 2A, 2B. For this purpose, the distal ends of the inlays 2A, 2B may be shaped with a plate with the negatives for the markings. In other embodiments the markings may be provided on the insert part 20 after it has been shaped with the holder/holders, e.g. by stamping, printing or other technique known in the art.

A corresponding marking between the holder 40', 40' and the corresponding hearing instrument 1A, 1B may be designed at the modeling stage such that the hearing instruments 1A, 1B are formed with a marking in an outer surface.

FIG. 7 also illustrates a hearing instrument system 100 comprising a set of hearing instruments 1A, 1B, and a hearing instrument charger device 30.

Figure 4:
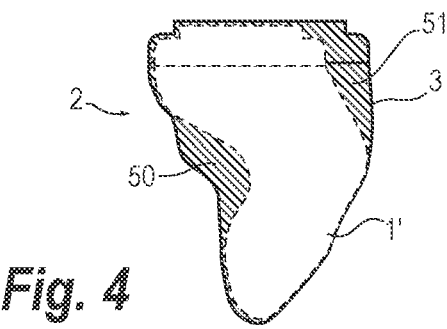
FIG. 4 illustrates a difference in shape between the hearing instrument shown in FIG. 2 and the corresponding inlay shown in FIG. 3.

As also mentioned above, FIG. 3 illustrates an inlay 2 corresponding to the hearing instrument element shown in FIG. 2. More precisely it illustrates the contour of an inlay 2 corresponding to the contour of the hearing instrument element shown in FIG. 2. As mentioned above, it will be appreciated that the contour/shape of the inlay 2 may not necessarily be 100% identical to the corresponding hearing instrument 1A, 1B. For example, some or all concave surfaces may not be reproduced in the inlay 2. This is illustrated in FIG. 4. In FIG. 4, the contour of the hearing instrument (represented by hearing instrument shell 1) shown in FIG. 2, is laid over the contour of the corresponding inlay 2 shown in FIG. 3, to illustrate a difference in shape between the hearing instrument shown in FIG. 2 and the corresponding inlay shown in FIG. 3.

As the inlay 2 will form the impression 2A, 2B' defining the shape of the holder 40', 40", it is clear that if the shape of the holder 40', 40" has e.g. concave surfaces, it will be difficult to insert a hearing instrument 1A, 1B that need to pass the concave surface during insertion of the hearing instrument 1A, 1B into the holder 40', 40".

Therefore, as indicated in FIG. 4, a volume 50 may be added to the inlay 2 to compensate for the "hook" shape provided by the concave surface. Adding such a volume 50 to the inlay will cause the corresponding impression 2A', 2B' in the sheet of vacuum formable material 14, and thereby the resulting holder 40', 40" to have a corresponding additional volume.

Further, in order to avoid that the hearing instrument 1A, 1B needs to pass through narrow passages at the entrance to a holder 40', 40", a volume 51 may be added at a portion of the inlay 2, which corresponds to an end of the hearing instrument 1A, 1B furthest away from the end which will be inserted into the holder 40', 40" first. Adding such a volume 51 to the inlay will cause the corresponding impression 2A', 2B' to be formed in the sheet of vacuum formable material 14 during manufacture of the insert part 20, and thereby result in the resulting holder 40', 40" to have a corresponding additional volume.

Thus, when shaping the inlay 2, 2A, 2B (and/or shaping the holder 40', 40"), it should be secured that the holder 40, 40', 40" is shaped such that when the finished hearing instrument 1A, 1B is inserted in the holder 40, 40', 40", the holder 40, 40', 40" supports the shape of the hearing instrument (1A, 1B) in a predetermined position.

This is done by securing that the holder 40, 40', 40" is shaped with at least a subset of surfaces identical to corresponding surfaces of the virtual hearing instrument shell 1A', 1B'.

In embodiments, where the holder(s) is/are formed by moulding around an inlay 2, 2A, 2B—such as by vacuum forming—inlay 2, 2A, 2B should be designed (modelled) and shaped with at least a subset of surfaces identical to corresponding surfaces of the virtual hearing instrument shell (1A', 1B').

It is to be noted that the figures and the above description have shown the example embodiments in a simple and schematic manner.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF PARTS

P pinna of user
EC ear canal of user
T tympanic membrane of user
A step: impression of ear canal (and tragus)
B step: 3D scan of impression
C step: digital design of virtual HI shell and inlays for charger insert
D1 step: 3D printing of HI shell with cavity
D2 step: 3D printed HI shells ready for mounting of electronics in cavity
D3 step: finished hearing instruments with electronics
E1 step: 3D printing of inlays
E2 step: finished, 3D printed inlays
E3 step: vacuum forming of charger insert part with impressions from inlays
1 hearing instrument shell, HI shell
1A hearing instrument, left HI shell with electronics
1A' left HI shell
1B hearing instrument, right HI shell with electronics
1B' right HI shell
1' volume of HI
2 inlay
2A left inlay
2A' impression of left inlay in vacuum formed charger insert part (bottom view)
2B right inlay
2B' impression of right inlay in vacuum formed charger insert part (bottom view)
3 volume of inlay
4 charger coil of HI
5 face plate
6 HI electronics
7 HI rechargeable cell
8 ear canal impression
8' virtual representation of scanned ear canal impression
9 HI receiver
10 3D scanner
11 PC with keyboard, mouse and suitable 3D modeling software
12 3D printer for printing HI shell
12' 3D printer for printing inlays
14 vacuum formable sheet in biocompatible material
20 charger insert part
22 right charger coil of charger
23 cable connecting charger electronics to charger coils of charger
24 left charger coil of charger
25 charger power supply
26 charger lid
27 charger electronics
28 charger casing
30 Hearing Instrument charger device/HI charger device
40 Holder for receiving a hearing instrument
50 volume added to inlay
51 volume added to inlay Items:
1. A method of manufacturing a holder (40) for holding an individually shaped, chargeable hearing instrument (1A, 1B) in a hearing instrument charger device (30) configured for charging the hearing instrument (1A, 1B), and comprising a first charger coil (22, 24), the method comprising the steps of determining a shape of at least a portion of an ear canal of a user from an ear canal impression (8);
designing digitally on a computer, based on the determined shape of the portion of the ear canal, a virtual representation of a hearing instrument shell (1A', 1B') of the hearing instrument (1A, 1B), and planning a position in the hearing instrument (1A, 1B) for a second charger coil (4);
shaping a holder (40), based on the virtual representation of the hearing instrument shell (1A', 1B'), such that the holder (40), when located in a hearing instrument charge device (30), supports the shape of the hearing instrument (1A, 1B) in a predetermined position, and such that the first charger coil (22, 24) is adjacent to the second charger coil (4).

2. The method according to item 1, wherein the step of shaping the holder (40) comprises the steps of
shaping an inlay (2A, 2B), with at least a subset of surfaces identical to corresponding surfaces of the virtual hearing instrument shell (1A', 1B'); and
forming the holder (40) around the inlay (2A, 2B).

3. The method according to item 2, wherein the step of shaping the inlay (2A, 2B) comprises rapid prototyping (RPT) the inlay (2A, 2B), based on the virtual representation of the hearing instrument shell (1A', 1B').

4. The method according to item 2 or 3, wherein the step of shaping the holder (40) comprises thermoforming a sheet of plastic over a part of the inlay (2A, 2B).

5. The method according to item 4, wherein the step of thermoforming a sheet of plastic over a part of the inlay (2A, 2B) comprises vacuum forming the sheet of plastic over a part of the inlay (2A, 2B).

6. The method according to any one of the items 1-5, wherein the step of determining a shape of at least a portion of an ear canal of a user comprises
inserting portion of a pliable material into the ear canal of a user, thereby forming an ear canal impression (8), and
scanning the ear canal impression (8) and entering the scanned shape into the computer (11).

7. The method according to any one of the items 1-6, wherein the holder (40) is formed in a biocompatible material.

8. The method according to item 5, wherein the material used for the holder (40) is the same as used for the ear canal impression (8).

9. A hearing instrument charger device (30) for charging an individually shaped hearing instrument (1A, 1B) comprising a second charger coil (4), the hearing instrument charger device (30) comprising
a charger casing (28);
a charger power supply (25) arranged within the charger casing (28);
a first charger coil (22, 24) connected to the charger power supply (25),
charger electronics (27) for controlling charging of the hearing instrument (1A, 1B); and
a holder (40) configured for receiving the hearing instrument (1A, 1B) arranged within the charger casing (28), wherein the holder (40) for the hearing instrument (1A, 1B) is shaped, such that the holder (40) supports the shape of the hearing instrument (1A, 1B), and such that the first charger coil (22, 24) is adjacent to the second charger coil (4), when the hearing instrument (1A, 1B) is received in the holder (40).

10. The hearing instrument charger device (30) according to item 9, wherein the holder (40) comprises surfaces identical to corresponding surfaces of the virtual hearing instrument (1A, 1B).

11. The hearing instrument charger device (30) according to item 9 or 10, wherein the holder (40) for the hearing instrument (1A, 1B) is provided in a charger insert part (20).

12. The hearing instrument charger device (30) according to item 11, wherein the charger insert part (20) is formed by a vacuum formable sheet (14).

13. The hearing instrument charger device (30) according to item 11 or 12, wherein the charger insert part (20) is as a flat structure having an upper surface, a lower surface, and a peripheral rim, where the holder (40) extends away from the lower surface, and where the peripheral rim is configured for cooperating with a rim of the charger casing (28).

14. The hearing instrument charger device (30) according to item 13, comprising a charger lid (26) arranged to cooperate with the charger casing (28), wherein the first charger coil (22, 24) is arranged in the charger lid (26) in such a way that the first charger coil (22, 24) faces the second charger coil (4) when the hearing instrument (1A, 1B) is placed in the holder (40) and the charger lid (26) is closed.

15. A hearing instrument system (100) comprising
a hearing instrument (1A, 1B); and
a hearing instrument charger device (30) according to any one of the items 8-12.

16. A hearing instrument system (100) according to item 14, wherein hearing instrument charger device (30) comprises a charger lid (26) arranged to cooperate with the charger casing (28), wherein the first charger coil (22, 24) is arranged in the charger lid (26), and wherein the hearing instrument (1A, 1B) comprises a second charger coil (4) formed in an externally facing face plate (5) of the hearing instrument (1A, 1B), and where the first charger coil (22, 24) and the second charger coil are arranged such that they face each other when the hearing instrument (1A, 1B) is received in the holder (40).

The invention claimed is:

1. A method of manufacturing a holder for holding an individually shaped hearing instrument in a hearing instrument charger device configured for charging the hearing instrument, the hearing instrument charger comprising a first charger coil, the method comprising:
obtaining data indicating a representation of a hearing instrument shell of the hearing instrument and/or a representation of an item for forming a holder, wherein the representation of the hearing instrument shell and/or the representation of the item is specific for a user of the hearing instrument;
obtaining a position of a second charger coil in the hearing instrument; and
forming the holder, based on the data and the position of the second charger coil, such that when the individually shaped hearing instrument is received in the holder, the second charger coil of the individually shaped hearing instrument is in an operative position for receiving charging power from the first charger coil of the hearing instrument charger device.

2. The method according to claim 1, wherein the act of forming the holder comprises:
forming an inlay, with at least a subset of surface parts corresponding with respective surface parts of the representation of the hearing instrument shell; and
forming the holder around the inlay.

3. The method according to claim 2, further comprising removing the inlay from the holder, leaving an impression of the inlay in the holder.

4. The method according to claim 2, wherein the representation of the item comprises a representation of the inlay, and wherein the act of forming the inlay comprises rapid prototyping the inlay based on the representation of the inlay.

5. The method according to claim 1, wherein the representation of the item is derived from the representation of the hearing instrument shell.

6. The method according to claim 5, wherein the representation of the item comprises a representation of an inlay, wherein the holder is formed using the inlay.

7. The method according to claim 5, wherein the representation of the item is obtained by enlarging the representation of the hearing instrument shell.

8. The method according to claim 1, wherein the act of forming the holder comprises thermoforming a sheet of plastic over a part of an inlay.

9. The method according to claim 8, wherein the act of thermoforming the sheet of plastic over the part of the inlay comprises vacuum forming the sheet of plastic over the part of the inlay.

10. The method according to claim 1, wherein the representation of the hearing instrument shell is based on a shape of at least a portion of an ear canal and tragus of the user of the hearing instrument.

11. The method according to claim 1, wherein the representation of the hearing instrument shell comprises scanning data obtained based on an ear canal.

12. The method according to claim 1, wherein the holder is formed using a biocompatible material.

13. The method according to claim 1, wherein the representation of the hearing instrument shell is based on an ear canal impression.

14. The method according to claim 13, wherein the holder is formed using a material that is the same as a material for the ear canal impression.

15. The method according to claim 1, further comprising creating the representation of the hearing instrument shell by:
inserting a portion of a pliable material into an ear canal and tragus of the user to form an ear canal impression;
scanning the ear canal impression to obtain scanned data; and
creating the representation of the hearing instrument shell based on the scanned data.

16. The method according to claim 1, wherein the holder is formed around an inlay, and wherein the inlay is configured to allow for insertion and removal of the hearing instrument shell without blockage by any part of the inlay.

17. The method according to claim 16, wherein the representation of the item comprises a representation of the inlay, and wherein the representation of the inlay comprises design features for the inlay such that when the inlay is formed, the inlay will allow for the insertion and the removal of the hearing instrument shell without blockage by any part of the inlay.

* * * * *